United States Patent
Liu et al.

(10) Patent No.: US 9,591,649 B1
(45) Date of Patent: Mar. 7, 2017

(54) METHOD AND SYSTEM OF REDUCING LOAD ON A DOWNLINK CONTROL CHANNEL

(71) Applicant: Sprint Spectrum L.P., Overland Park, KS (US)

(72) Inventors: Chunmei Liu, Great Falls, VA (US); Krishna Sitaram, Chantilly, VA (US); Daniel A. Vivanco, Sterling, VA (US); Hermanth B. Pawar, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 235 days.

(21) Appl. No.: 14/500,372

(22) Filed: Sep. 29, 2014

(51) Int. Cl.
*H04L 1/00* (2006.01)
*H04L 12/26* (2006.01)
*H04W 72/04* (2009.01)

(52) U.S. Cl.
CPC ...... *H04W 72/0486* (2013.01); *H04W 72/042* (2013.01)

(58) Field of Classification Search
CPC ..... H04L 5/001; H04L 5/0053; H04L 5/0055; H04L 5/0094; H04W 72/042
IPC ............... H04L 5/001,5/0053, 5/0055, 5/0094; H04W 72/042
See application file for complete search history.

(56) References Cited

U.S. PATENT DOCUMENTS

| | | | | |
|---|---|---|---|---|
| 2012/0009923 A1* | 1/2012 | Chen | ..................... | H04L 5/0091 455/434 |
| 2013/0163543 A1* | 6/2013 | Freda | ................ | H04W 72/0406 370/329 |

* cited by examiner

*Primary Examiner* — Yemane Mesfin
*Assistant Examiner* — Abdelillah Elmejjarmi

(57) ABSTRACT

Disclosed is a method and system for reducing the load on a downlink control channel of a given carrier of a plurality of carriers in a coverage area. As disclosed, a base station may determine that the downlink control channel of the given carrier is threshold loaded. In response to this determination, the base station may then (a) identify a particular subset of the UEs that are currently designated for DCI transmission on the downlink control channel of the given carrier and then (b) take action to de-designate the identified subset of UEs for DCI transmission on the given carrier and instead designate the identified subset of UEs for DCI transmission only on one or more other carriers in the coverage area.

17 Claims, 7 Drawing Sheets

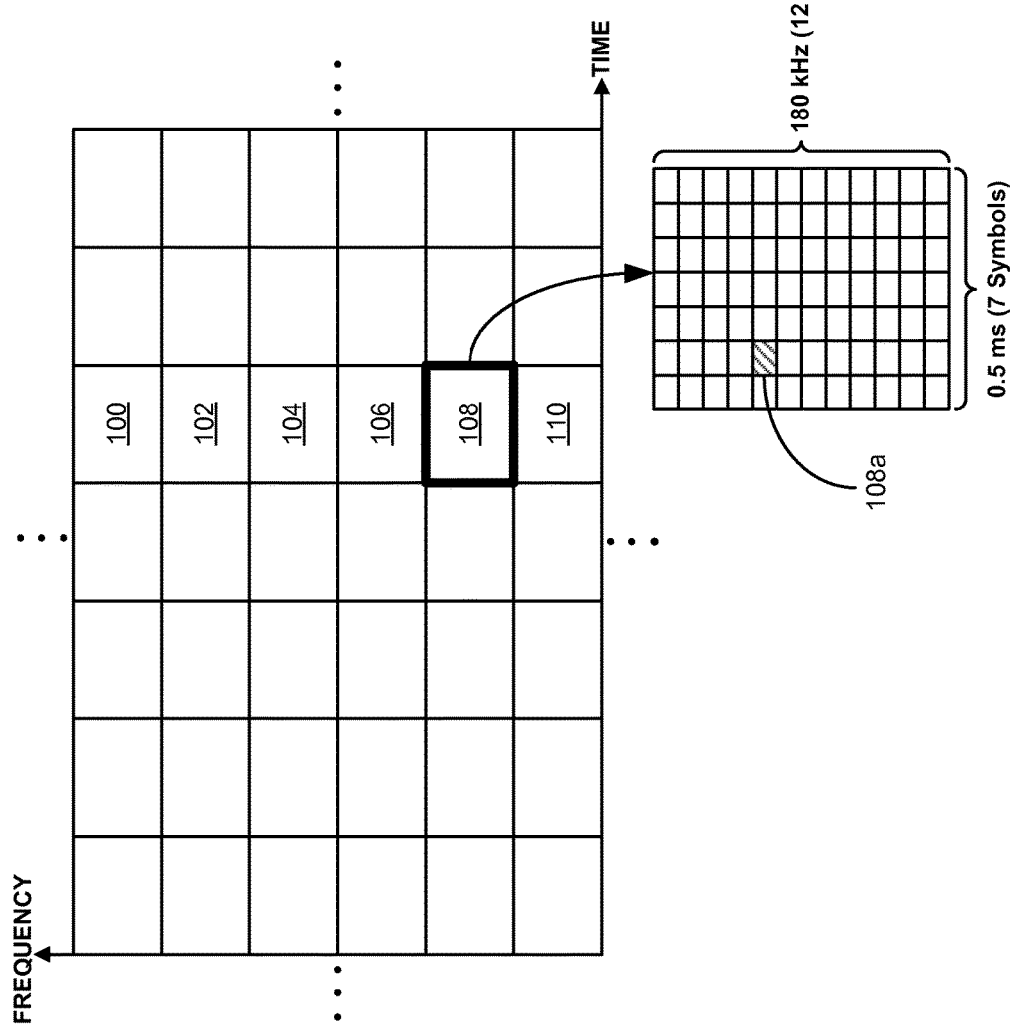

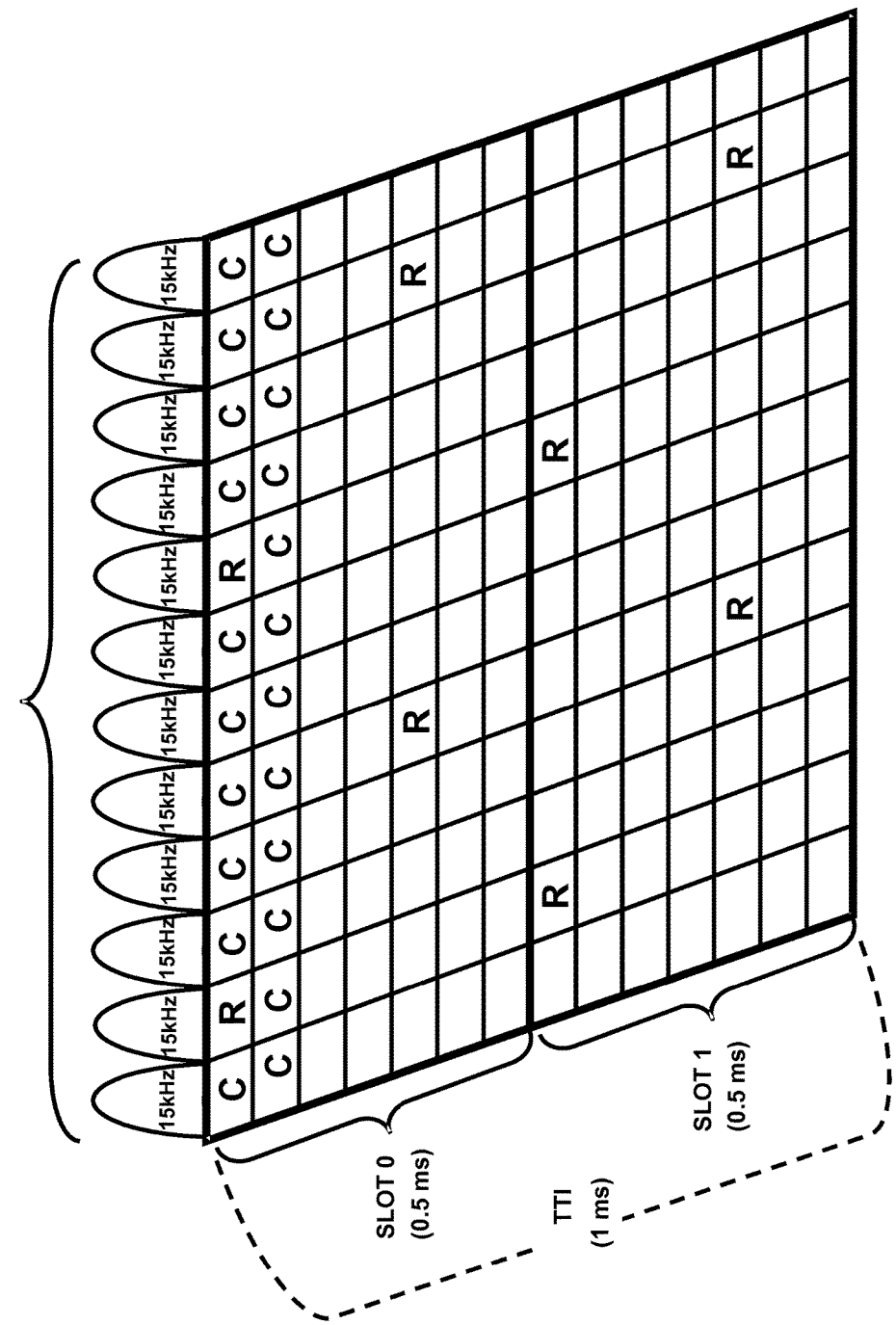

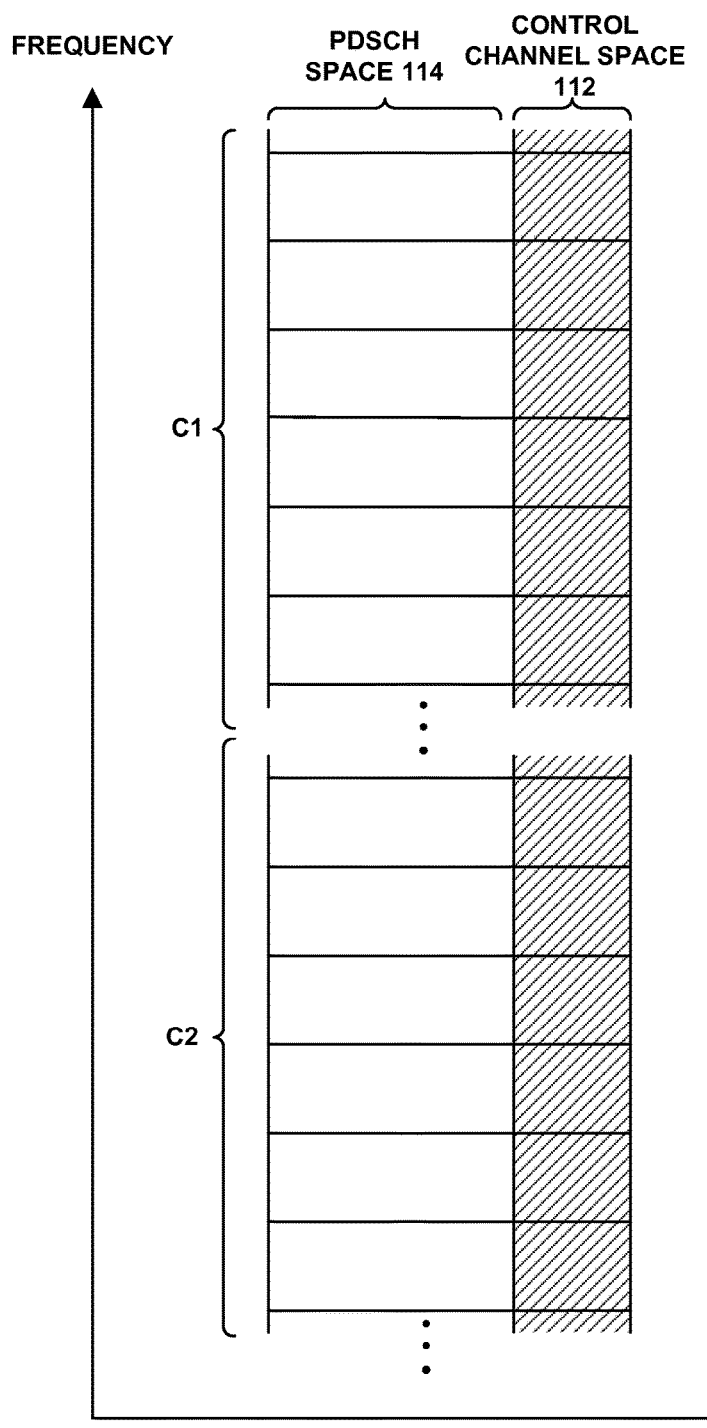

METHOD AND SYSTEM OF REDUCING LOAD ON A DOWNLINK CONTROL CHANNEL

BACKGROUND

Unless otherwise indicated herein, the description provided in this section is not prior art to the claims and is not admitted to be prior art by inclusion in this section.

A typical cellular wireless network includes a number of base stations that each radiate to define one or more coverage areas, such as cells or sectors, in which user equipment devices (UEs) can operate and engage in communication over an air interface with the cellular wireless network. Each base station may then be coupled with network infrastructure that provides connectivity with one or more transport networks, such as the public switched telephone network (PSTN) and/or the Internet for instance. Within this arrangement, a UE operating in a coverage area of the cellular wireless network can engage in communication, via the cellular wireless network, with remote network entities or with other UEs operating in the cellular wireless network.

The cellular wireless network will generally operate in accordance with a particular air-interface protocol or "radio access technology," examples of which may include Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. And this air-interface protocol may then define the structure of the cellular wireless network's air interface as well as the procedures for serving UEs over the air interface (e.g., registration, handover, scheduling, etc.)

In each of a base station's coverage areas, the base station may radiate to provide a frequency channel known as a "carrier" over which the base station may engage in air-interface communication with UEs operating in the coverage area, with this carrier comprising a downlink for carrying communications from the base stations to UEs and an uplink for carrying communications from UEs to the base stations. In practice, the carrier may operate on a particular carrier frequency or a particular pair of carrier frequencies. For instance, in an implementation known as frequency division duplex (FDD), the carrier may operate on a particular pair of carrier frequencies—one for the downlink and another for the uplink. Alternatively, in an implementation known as time division duplex (TDD) arrangement, the carrier may operate on a single carrier frequency, with the downlink and uplink being time-division multiplexed over this single carrier frequency.

The carrier's downlink and uplink may then be divided into discrete air-interface resources that may be used to carry control and/or bearer data between the base station and particular UEs. For example, in an OFDMA protocol such as LTE, the downlink may be divided in both the time and frequency domains into discrete "resource blocks," which may be used to carry control and/or bearer data to UEs. In particular, in the time domain, the LTE downlink may be divided into transmission time intervals (TTIs), or sub-frames, that each have a duration of 1 millisecond (ms) and consist of two 0.5 ms timeslots. And in the frequency domain, the LTE downlink may be divided into groups of 12 sub-carriers that each have a bandwidth of 15 KHz (for a total group bandwidth of 180 kHz), with each group of sub-carriers in a given TTI timeslot defining a different resource block. Thus, in each TTI slot, the LTE downlink has a finite number of resource blocks that is limited by the downlink's channel bandwidth. The LTE uplink may have a similar configuration.

The LTE protocol may also define various channels that are mapped onto the resource blocks of the carrier's downlink and uplink. For instance, on the downlink, a first portion of time of each resource block in each TTI slot may define channels for use in carrying control signaling from the base station to UE, such a physical downlink control channel (PDCCH), a Physical Control Format Indicator Channel (PCFICH), and a Physical Hybrid-ARQ Indicator Channel (PHICH). Then, the remaining portion of each resource block in a given TTI slot (other than any portion reserved for reference symbol use or the like) may define a Physical Downlink Shared Channel (PDSCH) for use in carrying bearer data from the base station to UEs.

The LTE uplink may have channels that are mapped to the uplink resource blocks in a similar manner, including a Physical Uplink Control Channel (PUCCH) that primarily serves to carry control signaling from UEs to the base station, a Physical Random Access Channel (PRACH) that primarily serves to carry random access preambles from UEs to the base station, and a Physical Uplink Shared Channel (PUSCH) that primarily serves to carry bearer data from UEs to the base station.

In an LTE system arranged as above, when a UE enters into a coverage area of a base station, the UE may engage in attach signaling with the base station in order to register for service by the base station on the carrier provided in the coverage area. Through the attach process and/or subsequently, the base station and supporting LTE network infrastructure may establish one or more bearers for the UE, essentially defining logical tunnels for carrying bearer data between the UE and a transport network such as the Internet. Thereafter, the UE may operate either in an idle mode or a connected mode on the carrier.

In the idle mode, the UE may periodically monitor a downlink control channel (e.g., the PDCCH) on the carrier to receive overhead system information and to check for any page messages destined to the UE. If the UE then receives a page message intended for the UE and/or if the UE seeks to engage in bearer communication with the network, the UE may then transmit a random access preamble or other such request to the base station over an uplink control channel (e.g., the PRACH) of the carrier, to which the base station may respond by allocating certain PUSCH resources to the UE so that the UE can send a connection request. In turn, the UE may send a connection request to the base station, which serves to establish an air-interface "connection" between the UE the base station and cause the UE to begin operating in the connected mode.

While the UE is operating in the connected mode, the base station may then operate to schedule data communications with the UE on the carrier. For instance, when the base station has bearer data to transmit to the UE, the base station may seek to allocate particular PDSCH resources on the carrier for use to transmit that bearer data to the UE. In turn, the base station may transmit a "Downlink Control Information" (DCI) message to the UE over the PDCCH of the carrier, where this DCI message serves to identify the particular PDSCH resources of the carrier that have been allocated for the data transmission to the UE. Finally, the base station may transmit the bearer data using the allocated PDSCH resources on the carrier, and the UE may read the bearer data from these allocated PDSCH resources in accordance with the DCI message.

Similarly, when the UE has bearer data to transmit to the base station, the WCD may transmit a scheduling request to the base station and the base station may then seek to allocate particular PUSCH resources on the carrier for use to transmit the bearer data from the UE to the base station. In turn, the base station may transmit a DCI message to the UE over the PDCCH of the carrier, where this DCI message serves to identify the particular PUSCH resources of the carrier that have been allocated for the data transmission from the UE. Finally, in accordance with this DCI message, the UE may transmit the bearer data using the allocated PUSCH resources on the carrier.

Overview

In an ODFM system like the one described above, certain base stations may be configured to provide multiple carriers in a given coverage area, with each of these carriers operating on a different carrier frequency (or a different pair of carrier frequencies). In such an arrangement, a base station could then be configured to employ "carrier aggregation," which enables the base station to provide service to capable UEs on multiple carriers concurrently. In this way, the base station and the capable UEs may effectively treat the multiple carriers in the coverage area (which may be referred to as "component carriers") as a single aggregate carrier that has an increased bandwidth and thus theoretically supports a higher data rate.

According to an example implementation, when a UE enters into a coverage area of a base station that is employing carrier aggregation, the UE may attach with the base station over a first component carrier in that coverage area. At that time, the base station may designate the first component carrier as the "primary" carrier (or "PCell") for the UE, and may also designate at least one other component carrier in the coverage area as a "secondary" carrier (or "SCell") for the UE. In turn, the base station may decide whether to schedule data transmissions to the UE across these carriers using either "same-carrier scheduling" or "cross-carrier scheduling."

With same-carrier scheduling, the base station may be configured to schedule data transmissions with the UE on each component carrier individually. For instance, when the base station allocates shared-channel resources (e.g., PDSCH or PUSCH resources) for a data transmission with the UE on the UE's primary carrier, the base station will send the DCI for this allocation on the primary carrier's PDCCH. And if the base station allocates shared-channel resources for a data transmission with the UE on the UE's secondary carrier, the base station will send the DCI for this allocation on the secondary carrier's PDCCH. Thus, if the base station decides to designate the UE for same-carrier scheduling, the base station may then operate to send DCIs to the UE both on the PDCCH of the UE's primary carrier (for any shared-channel resources allocated on the primary carrier) and on the PDCCH of the UE's secondary carrier (for any shared-channel resources allocated on the secondary carrier). Correspondingly, when designated for same-carrier scheduling, the UE may operate to monitor both PDCCH of the UE's primary carrier and the PDCCH of the UE's secondary carrier.

With cross-carrier scheduling, on the other hand, the base station may be configured to schedule data transmissions with the UE across all of the component carriers collectively. For instance, regardless of whether the base station allocates shared-channel resources for a data transmission with the UE on the UE's primary carrier or the UE's secondary carrier, the base station will send the DCI for this allocation on the primary carrier's PDCCH. Thus, if the base station decides to designate the UE for cross-carrier scheduling, the base station may then operate to send DCIs to the UE only on the PDCCH of the UE's primary carrier (for any shared-channel resources allocated either on the primary carrier or on the secondary carrier). Correspondingly, when designated for cross-carrier scheduling, the UE may operate to monitor the PDCCH of the UE's primary carrier only.

The base station may make its decision of whether to designate the UE for same-carrier scheduling or cross-carrier scheduling based on various factors, examples of which may include interference between PDCCHs of neighboring base stations. After making this decision, the base station may then notify the UE of that decision. For instance, the base station may send to the UE (e.g., via one or more RRC messages) an indication of the type of scheduling that the base station has designated for the UE. In turn, the base station and the UE may both begin to operate in accordance with the base station's designation of the UE.

It should be understood that at some later time, the base station could update its decision of whether to designate the UE for same-carrier scheduling or cross-carrier scheduling (e.g., based on one or more of the same factors that led to the base station's initial decision). And it should also be understood that at some later time, the UE's primary and secondary carriers could change (e.g., as a result of a handover), which may in turn cause the base station to change how it schedules data transmissions with the UE.

With the arrangement described above, it is apparent that a base station may designate some UEs for DCI transmission on multiple carriers (in accordance with single-carrier scheduling) and may designate other UEs for DCI transmission on only a single carrier (in accordance with cross-carrier scheduling). It then follows that the PDCCH of a particular carrier may be used to send both (1) DCIs for scheduling data transmissions on that carrier and (2) DCIs for scheduling data transmissions on one or more other carriers in the coverage area. However, the PDCCH of a carrier only has a limited capacity. Thus, as the extent of DCIs being sent on the PDCCH of a carrier in a coverage area increases, the PDCCH may ultimately become congested and certain DCIs may end up getting delayed or even blocked—which may inhibit the base station's ability to schedule data transmissions with certain UEs (either on the particular carrier or a some other carrier in the coverage area) even though there may be shared-channel resources available for these data transmissions. Moreover, this increase in the extent of DCIs being sent on the PDCCH of a carrier in one coverage area may cause increased interference on the PDCCHs of other carriers operating on the same carrier frequency in neighboring coverage areas.

Disclosed herein are functions that help to address these issues. In accordance with the disclosure, while a base station is serving UEs on a plurality of carriers in a coverage area, the base station may determine that a downlink control channel (e.g., the PDCCH) of a given carrier of the plurality of carriers is threshold loaded. In response to this determination, the base station may attempt to reduce the load on the given carrier's downlink control channel by (a) identifying a particular subset of the UEs that the base station currently has designated for DCI transmission on the given carrier and then (b) acting to de-designate the identified subset of UEs for DCI transmission on the given carrier and instead designate the identified subset of UEs for DCI transmission only on one or more other carriers in the coverage area. The base station may employ at least two different approaches to accomplish this.

According to a first approach, the base station may identify, from the UEs that the base station currently has designated for DCI transmission over the given carrier, a group of one or more UEs with a primary carrier that differs from the given carrier. In practice, a UE that meets this condition will typically be one that the base station has designated for same-carrier scheduling on both the UE's primary carrier and the given carrier, which serves as a secondary carrier for the UE. In turn, the base station may begin serving the group of one or more UEs using cross-carrier scheduling, which will cause the base station to transmit DCIs to each UE in the group only on the UE's primary carrier and not on the given carrier—even in situations where the DCIs serve to allocate shared-channel resources on the given carrier.

According to a second approach, the base station may identify, from the UEs that the base station currently has designated for DCI transmission over the given carrier, a group of one or more UEs that are designated for cross-carrier scheduling and have the given carrier as the primary carrier. In turn, the base station may initiate a change of the primary carrier of each UE in the group from the given carrier to a new primary carrier (e.g., the carrier having the PDCCH with the lowest load) while maintaining the designation of cross-carrier scheduling for each identified UE. Similar to the first approach, this will cause the base station to transmit DCIs to each UE in the group only on the UE's new primary carrier and not on the given carrier—even in situations where the DCIs serve to allocate shared-channel resources on the given carrier.

Advantageously, a base station operating in accordance with the present disclosure may thus be able to reduce the load of a given carrier's PDCCH while at the same time continuing to schedule data transmissions on that given carrier (e.g., by using the PDCCH of another carrier in the coverage area).

Accordingly, in one respect, disclosed herein are methods operable by a base station (e.g., an eNodeB) that is configured to serve UEs over a plurality of carriers in a coverage area, where each of the plurality of carriers defines a respective downlink control channel (e.g. a PDCCH) over which the base station transmits DCIs for scheduling data transmissions with UEs in the coverage area.

In accordance with a first method, the base station determines that a downlink control channel of a given carrier of the plurality of carriers is threshold loaded. In response to this determination, the base station (a) identifies a group of one or more UEs that are currently designated for DCI transmission on the downlink control channel of the given carrier but have a primary carrier that differs from the given carrier (e.g., UEs that are currently designated for same-carrier scheduling and have the given carrier designated as a secondary carrier) and then (b) begins to serve the group of one or more UEs using cross-carrier scheduling.

In accordance with a second method, the base station determines that a downlink control channel of a given carrier of the plurality of carriers is threshold loaded. In response to this determination, the base station (a) identifies a group of one or more UEs that are currently designated for cross-carrier scheduling and have the given carrier as a primary carrier and then (b) initiates a change of the primary carrier of each UE in the group from the given carrier to a different carrier of the plurality of carriers.

In these methods, the act of determining that the downlink control channel of the given carrier is threshold loaded may take various forms. In one implementation, this act may involve determining that a number UEs that are currently designated for DCI transmission on the downlink control channel of the given carrier exceeds a threshold number. In another implementation, this act may involve determining that an extent of the downlink control channel of the given carrier being used exceeds a threshold extent. Other implementations may be possible as well.

Further, the act of the base station beginning to serve the group of one or more UEs using cross-carrier scheduling may take various forms. For instance, this act may involve, for each UE in the group, (i) the base station designating the UE for DCI transmission only on a downlink control channel of the primary carrier of the UE, and (ii) in accordance with the designating, the base station thereafter transmitting DCIs to the UE only on the downlink control channel of the primary carrier of the UE (including any DCIs for scheduling a data transmission with the UE on the given carrier). This act could take other forms as well.

Further yet, the act of initiating the change of the primary carrier of each UE in the group from the given carrier to a different carrier of the plurality of carriers may take various forms. For instance, this act may involve, for each UE in the group, (i) selecting the different carrier for the UE and then (ii) initiating a handover of the UE from the given carrier to the selected different carrier. This act could take other forms as well.

In another respect, disclosed is a base station that includes (a) a wireless communication interface configured to provide a plurality of carriers in a coverage area for serving UEs, where each of the plurality of carriers defines a respective downlink control channel for transmitting DCIs for scheduling data transmissions with UEs in the coverage area, and (b) a controller (e.g., a programmed processing unit) configured to carry out various base station functions disclosed herein.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 2A is an illustration of a division of a shared downlink channel into downlink resource blocks, in accordance with an example embodiment.

FIG. 2B is an illustration of a pair of downlink resource blocks, in accordance with an example embodiment.

FIG. 2C is an illustration of a segment of an example downlink TTI slot, depicting a relationship between control channel space and bearer channel space in an example embodiment.

DETAILED DESCRIPTION

The present method and apparatus will be described herein in the context of LTE. However, it will be understood that principles of the disclosure can extend to apply in other scenarios as well, such as with respect to other air-interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
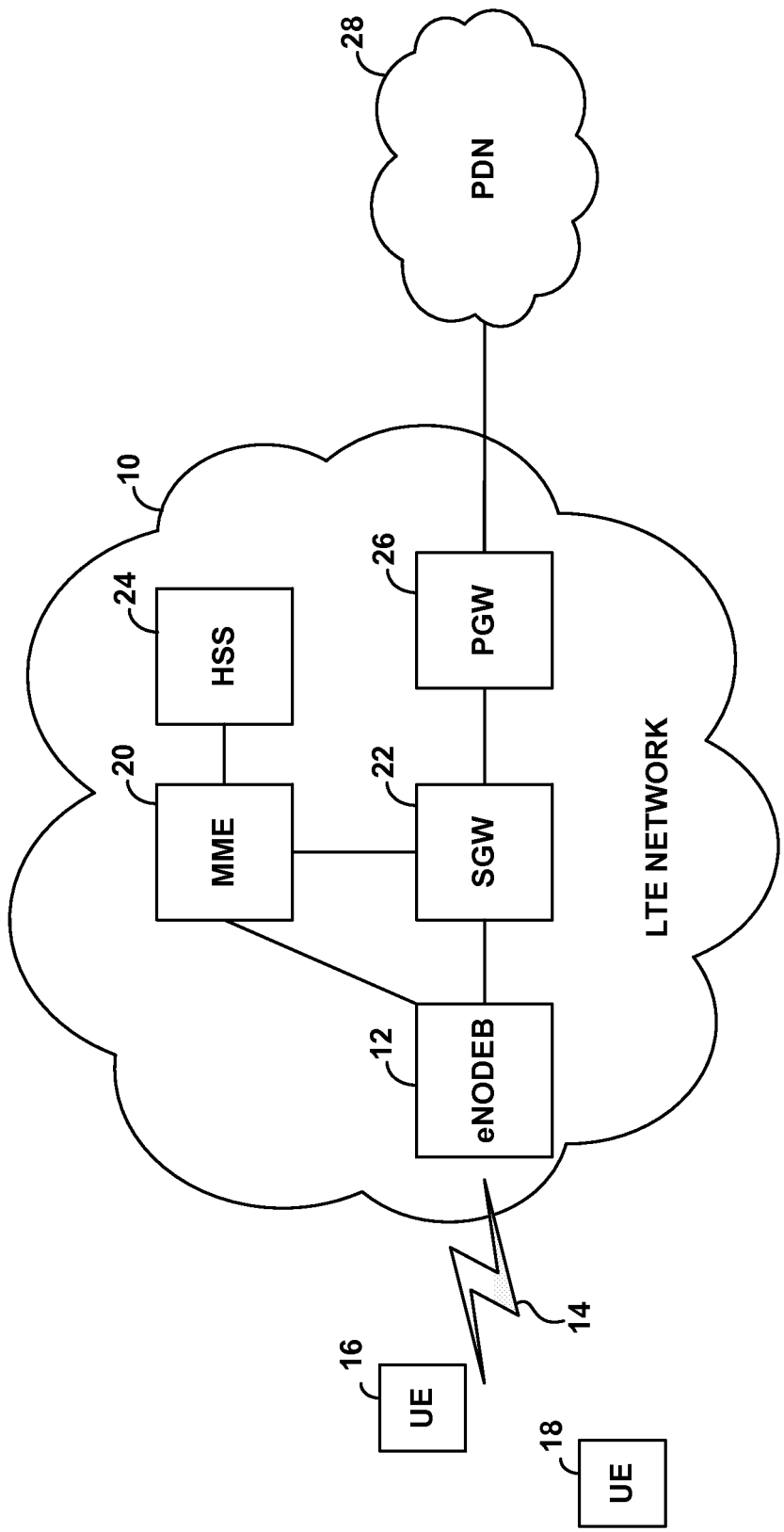
FIG. 1 is a simplified block diagram of a wireless communication system in which the disclosed method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice over Internet Protocol (VoIP) service, but may also provide other functions.

As shown, the LTE network includes an eNodeB 12, which has an antenna structure and associated equipment for providing an LTE coverage area 14 in which to serve UEs such as example UE 16 and example UE 18 as shown. eNodeB 12 then has a communication interface with a mobility management entity (MME) 20 and with a serving gateway (SGW) 22. MME 20 may generally function as a signaling controller for the LTE network, and may have a communication interface both with SGW 22 and with a home subscriber server (HSS) 24 that stores subscriber profiles for UEs registered with LTE network. SGW 22 may in turn have a communication interface with a PDN gateway (PGW) 26 that provides connectivity with at least one PDN 28. In practice, the illustrated components of the LTE network may sit as nodes on a private packet-switched network owned by an operator of the LTE network, and thus the various communication interfaces may be logical interfaces through that network.

In line with the discussion above, eNodeB 12 may be configured to employ carrier aggregation over multiple component carriers in coverage area 14, with these component carriers operating on respective carrier frequencies (or respective pairs of carrier frequencies) that are contiguous within the same frequency band, non-contiguous in the same frequency band, and/or non-contiguous in different frequency bands. For example, eNodeB 12 is shown in FIG. 1 as providing three component carriers C1, C2, and C2 in coverage area 14. Correspondingly, UE 16 and UE 18 may be configured for carrier aggregation.

Further, in line with the discussion above, each of the eNodeB's component carriers may include a downlink and an uplink, which are then further divided into discrete resources (e.g., resource blocks and corresponding channels) that may be used to carry control and/or bearer data between the eNodeB and particular UEs. FIG. 2A illustrates one example of how a carrier's downlink may be divided in frequency and domains into resource blocks under an ODFM protocol such as LTE. (As noted above, in LTE, a carrier's uplink may be divided into resource block in a similar manner.)

As shown in FIG. 2A, an LTE downlink may be divided in the frequency domain into respective 180 kHz ranges of frequency bandwidth and in the time domain into 1 ms TTIs that each consist of two 0.5 ms timeslots, with each respective 180 kHz range of frequency in a respective TTI slot then comprising a different resource block. By way of example, FIG. 2A shows six resource blocks 100-110 for a particular TTI slot. It should be understood, however, that although FIG. 2A shows six resource blocks in each TTI slot, a base station's downlink could have a greater number of resource blocks in each TTI slot depending on the downlink's channel bandwidth, as indicated by the dots above and below resource blocks 100-110.

FIG. 2A also includes a more detailed view of downlink resource block 108. As shown, in the frequency domain, the resource block's 180 kHz of frequency bandwidth comprises 12 sub-carriers that each have a bandwidth of 15 kHz. And in the time domain, the resource block may include a number of time segments that each correspond to the duration of an OFDM symbol. For instance, the resource block 108 is shown as having time segments for 7 OFDM symbols, although the number of OFDM symbols in a downlink resource block can vary. The group of 12 sub-carriers in each respective time segment may then be modulated together to form a respective OFDM symbol that is then transmitted on the downlink.

Each respective sub-carrier in each respective time segment may then be considered a resource element, which is generally the smallest defined unit of the LTE downlink. For instance, the detailed view of FIG. 2A shows that the resource block 108 may comprise a total of 84 resource elements, such as representative resource element 108*a*. Each of the resource elements can then be modulated to carry a certain number of bits, with that number depending on the particular MCS that is used for the data transmission.

Different resource elements in a downlink resource block may also be used for different purposes. FIG. 2B illustrates different functions among the resource elements in two successive resource blocks of an example LTE downlink. In this example, certain of the resource elements are labeled "R" to indicate that they are reserved for reference signals used for channel estimation. In addition, certain of the resource elements in the first two OFDM symbols are labeled "C" to indicate that they are used to transmit control signaling (e.g., the PCFICH, PHICH, and PDCCH). The other resource elements that are unlabeled can be used to transmit user data (e.g., the PDSCH). It is to be understood that FIG. 2B illustrates only one possible configuration, and that a downlink resource block could have various other configurations as well.

FIG. 2C next depicts a segment of an example downlink TTI slot, to help illustrate an example relationship between control channel space and PDSCH space on the eNodeB's carriers. As shown, a first portion of time (e.g., the first one, two, or three OFDM symbol segments) of each resource block in a given TTI slot of a carrier is reserved for use to define control channel space 112, which is generally divided between the PCFICH, the PHICH, the PDCCH. For instance, a particular set of the resource elements in the control channel space may be set aside to define the PCFICH and PHICH, leaving the remaining resource elements of the control channel space for use to define the PDCCH. Then, the remaining portion of each resource block in a given TTI slot of a carrier (other than resource elements reserved for reference symbol use or the like) is available for use to define PDSCH space 114.

As noted above, one of the main functions of the PDCCH in the control channel space 112 is to carry DCIs to served UEs. LTE defines various types or "formats" of DCIs, to be used for different purposes, including DCIs that serve to schedule data transmissions with served UEs by identifying shared-channel resources (e.g., PDSCH and PUSCH resources) that have been allocated for the data transmissions and also providing other information that may be used to receive or send data over the allocated resources (e.g., modulation scheme). In practice, these DCIs may each span a particular set of resource elements in the PDCCH portion of the control channel space 112 (e.g., one, two, four, or eight control channel elements (CCEs), each including 36 resource elements) and may include a cyclic redundancy check (CRC) that is masked (scrambled) with an identifier (e.g., cell radio network temporary identifier (C-RNTI)) assigned to the UE, so that the UE can identify and read the DCI message.

Referring back to FIG. 1, when a UE such as UE 16 enters into coverage area 14, the UE may attach with eNodeB 12 over a first component carrier in coverage area 14, such as carrier C1. At that time, eNodeB 12 may designate carrier C1 as the UE's primary carrier and may also designate at least one other component carrier in the coverage area, such as carrier C2, as the UE's secondary carrier. (It should be understood that a different carrier in coverage area 14 could be designated as the UE's primary carrier. For instance, instead of being the first carrier perceived by the UE that satisfies the UE's minimum required RF conditions for attachment, the primary carrier could be the carrier on which the UE perceives the best RF conditions. Or the UE's primary carrier could be selected based on some other criteria. Likewise, the UE's one or more secondary carriers could be selected based on various criteria, examples of which may include channel bandwidth and/or load). In turn, eNodeB 12 may then decide whether to schedule data transmissions to UE 16 across its primary and secondary carriers using either same-carrier scheduling or cross-carrier scheduling.

As noted above, with same-carrier scheduling, eNodeB 12 may operate to send DCIs to UE 16 on a per carrier basis, with DCIs for any shared-channel resource allocation on carrier C1 being sent to UE 16 over the PDCCH of carrier C1 and DCIs for any shared-channel resource allocation on carrier C2 being sent to UE 16 over the PDCCH of carrier C2. On the other hand, with cross-carrier scheduling, eNodeB may operate to send DCIs to UE 16 only on the PDCCH of the UE's primary carrier of C1, regardless of whether the DCIs are for shared-channel resource allocations on C1 or C2.

After deciding whether to designate UE 16 for same-carrier scheduling or cross-carrier scheduling, eNodeB 12 may store an indication of the eNodeB's decision together with identifiers of the UE's primary and secondary carriers. Additionally, eNodeB 12 may send to UE 16 (e.g., via one or more RRC messages) an indication of the type of scheduling that the eNodeB has designated for the UE. In turn, eNodeB 12 and UE 16 may both begin to operate in accordance with the base station's designation for the UE. For instance, if eNodeB 12 designates UE 16 for same-carrier scheduling, eNodeB 12 may then operate to send DCIs to UE 16 both on carrier C1 (for any shared-channel resource allocation on C1) and on carrier C2 (for any shared-channel resource allocation on C2), and UE 16 may thus operate to monitor the PDCCHs of both C1 and C2. On the other hand, if eNodeB 12 designates UE 16 for cross-carrier scheduling, eNodeB 12 may then send DCIs to UE 16 only on carrier C1 (for any shared-channel resource allocation on either C1 or C2), and UE 16 may thus operate to monitor the PDCCH of C1 only.

Thus, it is apparent that eNodeB 12 may designate some UEs for DCI transmission on multiple component carriers in coverage area 14 (in accordance with single-carrier scheduling) and may designate other UEs for DCI transmission on only a single component carrier in coverage area 14 (in accordance with cross-carrier scheduling). It then follows that the PDCCH of a particular component carrier in coverage area 14, such as carrier C1, may be used to send both (1) DCIs that serve to schedule data transmissions on carrier C1 and (2) DCIs that serve to schedule data transmissions on carrier C2 or carrier C3. However, the PDCCH of carrier C1 only has a limited capacity, which is generally constrained by the channel bandwidth of carrier C1 and the number of OFDM symbol segments reserved for control channel space in each downlink TTI slot of carrier C1. Thus, as the extent of DCIs being sent on the PDCCH of a carrier C1 increases, the PDCCH may ultimately become congested and certain DCIs may end up getting delayed or even blocked—which may inhibit the eNodeB's ability to schedule data transmissions with certain UEs even though there may be resources available for these data transmissions. Additionally, this increase in the extent of DCIs being sent on the PDCCH of carrier C1 in coverage area 14 may also cause increased interference on the PDCCHs of other carriers operating on the same carrier frequency in neighboring coverage areas.

Disclosed herein are functions that help to address these issues. In accordance with the disclosure, a base station such as eNodeB 12 that is employing carrier aggregation across multiple carriers in a coverage area may determine that a downlink control channel of a given one of these carriers (e.g., the PDCCH of carrier C1) is threshold loaded. In response to this determination, the base station may attempt to reduce the load on the downlink control channel by (a) identifying a particular subset of the UEs that the base station currently has designated for DCI transmission on the given carrier and then (b) taking action to de-designate the identified subset of UEs for DCI transmission on the given carrier and instead designate the identified subset of UEs for DCI transmission only on one or more of the other carriers in the coverage area (e.g., carrier C2 and/or carrier C3). As noted above, the base station may employ at least two different approaches to accomplish this in accordance with the present disclosure.

Figure 3:
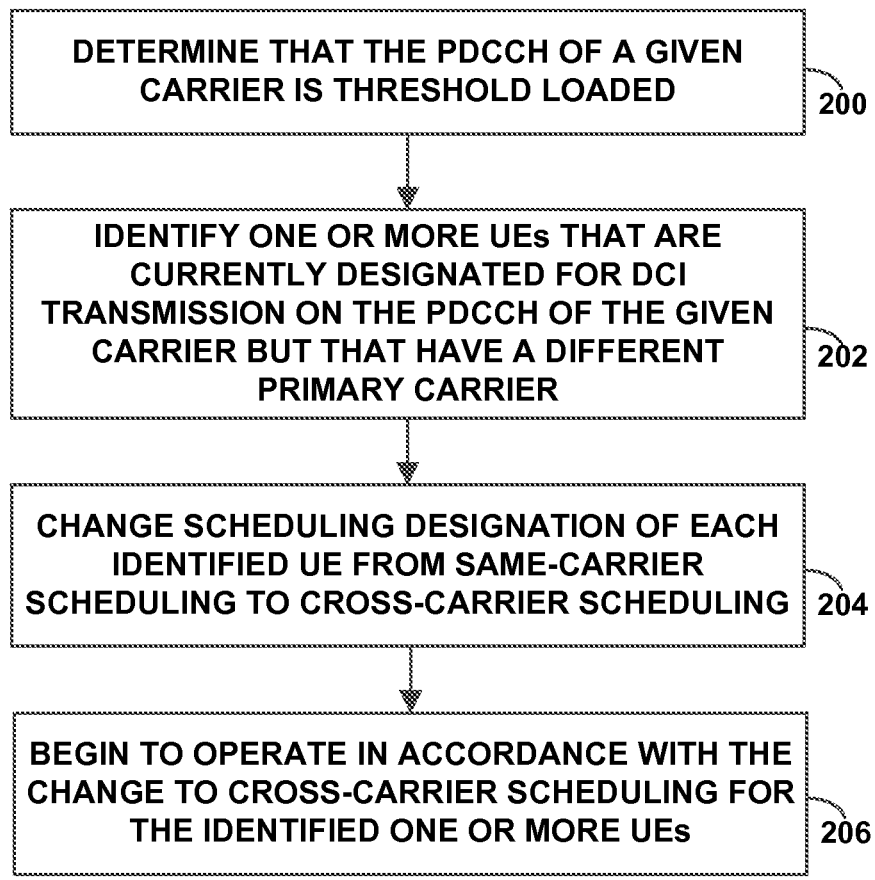
FIG. 3 is a flow chart depicting example functions that can be carried out in accordance with the disclosure.

FIG. 3 is next a flow chart depicting functions that can be carried out by a base station in accordance with a first disclosed approach for reducing load on a downlink control channel of a carrier. For purposes of illustration only, these functions are described below with reference to the LTE network arrangement depicted in FIG. 1 and the LTE air interface depicted in FIGS. 2A-2C. It should be understood, however, that the functions could be applied to other scenarios as well, including network arrangements and air interfaces that are configured according to another protocol. It should also be understood that other entities in a wireless communication system (e.g., a controller) may assist in carrying out at least some of these functions.

As shown in FIG. 3, at block 200, the eNodeB may determine that the PDCCH of one of the carriers in coverage area 14, such as carrier C1, is threshold loaded. The eNodeB may carry out this determination in various manners.

In one implementation, the eNodeB may determine that the PDCCH of carrier C1 is threshold loaded based on an evaluation of a number of UEs that are designated for DCI transmission on the PDCCH of carrier C1. For instance, the eNodeB may determine this number by accessing stored data that indicates the scheduling and carrier designations for UEs in coverage area 14. In practice, this number may include (1) any UE that has been designated for cross-carrier scheduling and has carrier C1 designated as the UE's primary carrier, as well as (2) any UE that has been designated for same-carrier scheduling and has carrier C1 designated either as the UE's primary carrier or as a secondary carrier. Once the eNodeB determines the number of UEs that are currently designated for DCI transmission on the PDCCH of carrier C1, the eNodeB may then compare this number to a threshold number that is deemed to represent a high load on the PDCCH of carrier C1. This threshold number may be a configurable parameter that is selected based on various factors, examples of which may include the channel bandwidth of carrier C1, the number of OFDM symbol segments reserved for control channel space in each downlink TTI slot of carrier C1, or other factors that may impact PDCCH capacity. Finally, based on the comparison, the eNodeB may determine that the number of UEs currently designated for DCI transmission on the PDCCH of carrier C1 exceeds the threshold number.

In another implementation, the eNodeB may determine that the PDCCH of carrier C1 is threshold loaded based on an evaluation of an extent of PDCCH resources being used on carrier C1. For instance, the eNodeB may first determine an extent of PDCCH resources being used on carrier C1 using a measure such as a percentage of available PDCCH resource elements that have been (or will be) used over a certain time interval (e.g., one or more TTI slots), a number of available PDCCH resource elements that have been (or will be) used over a certain time interval, an amount of control data that has been (or will be) transmitted on the PDCCH over a certain time interval, or the like. In turn, the eNodeB may then compare the determined extent of PDCCH resources being used on carrier C1 to a threshold extent that is deemed to represent a high load on the PDCCH of carrier C1. This threshold extent may be a configurable parameter that is represented according to the same measure used to determine the extent of PDCCH resources. Finally, based on the comparison, the eNodeB may determine that the extent of PDCCH resources being used on carrier C1 exceeds the threshold extent of PDCCH resources.

It should be understood that the implementations described above could also be combined, such that the eNodeB may be configured to determine that the PDCCH of carrier C1 is threshold loaded based either on a number of UEs that are currently designated for DCI transmission on the PDCCH of carrier C1 or on an extent of PDCCH resources being used on carrier C1. And the eNodeB could be configured to make this determination in other manners as well.

At block 202, in response to determining that the PDCCH of carrier C1 is threshold loaded, the eNodeB may then identify, from the UEs that are currently designated for DCI transmission on the PDCCH of carrier C1, one or more UEs with a primary carrier that differs from carrier C1 (e.g., a primary carrier of C2 or C3). As noted above, in practice, a UE that meets this condition will typically be one that the eNodeB has designated for same-carrier scheduling and that has carrier C1 designated as a secondary carrier (with either carrier C2 or carrier C3 being the UE's primary carrier). Thus, in one example, the eNodeB may carry out this identification based on stored data that indicates the scheduling and carrier designations for UEs in coverage area 14. But the eNodeB could carry out this identification in other manners as well.

The act of identifying the one or more UEs that are currently designated for DCI transmission on the PDCCH of carrier C1 but that have a primary carrier that differs from carrier C1 could be implemented in various ways. For instance, in one implementation, this act could involve identifying all of the UEs that are currently designated for DCI transmission on the PDCCH of carrier C1 but that have a primary carrier that differs from carrier C1. Alternatively, in another implementation, this act could involve identifying only a subset of the UEs that are currently designated for DCI transmission on the PDCCH of carrier C1 but that have a primary carrier that differs from carrier C1.

For example, the eNodeB could be configured to identify only up to a given number of UEs that are currently designated for DCI transmission on the PDCCH of carrier C1 but have a different primary carrier. In this example, the given number could either be predefined or could be defined dynamically based factors such as the loading of the PDCCH on carrier C1 (e.g., the given number may be set to the difference between the number of UEs that are currently designated for DCI transmission on the PDCCH of carrier C1 and a threshold number). As another example, the eNodeB could be configured to identify only those UEs that are currently designated for DCI transmission on carrier C1 and have a particular primary carrier, such as only UEs that have a primary carrier of C2 or only UEs that have a primary carrier of C3. In this example, the particular primary carrier could be preselected or instead could be selected dynamically based on various factors, such as which carrier has the lowest-loaded PDCCH. Other examples are possible as well.

At block 204, after identifying the one or more UEs that are currently designated for DCI transmission on the PDCCH of carrier C1 but have a primary carrier of C2 or C3, the eNodeB may then change the scheduling designation of each identified UE from same-carrier scheduling to cross-carrier scheduling. In practice, this change will effectively cause each identified UE to be de-designated for DCI transmission on the PDCCH of carrier C1 and instead be designated for DCI transmission on the PDCCH of the UE's primary carrier (e.g., C2 or C3) only.

The act of changing the scheduling designation may take various forms, but in general, it may involve the eNodeB performing functions such as updating a stored indication of the scheduling designation for each identified UE to reflect that the UE is now designated for cross-carrier scheduling and notifying each identified UE of the change in its scheduling designation (e.g., via one or more RRC messages). The act of changing the scheduling designation may involve other functions as well.

At block 206, the eNodeB may then begin to operate in accordance with the change to cross-carrier scheduling for the one or more identified UEs. For instance, in accordance with the change, the eNodeB may operate to send DCIs to each identified UE only on the UE's primary carrier (which will be C2 or C3) and not on carrier C1—even in situations where the DCIs are for shared-channel resource allocations on carrier C1. This should then result in a reduction of the load on the congested PDCCH of carrier C1, which may enable the eNodeB to provide better service to the UEs that are still designated for DCI transmission on the PDCCH of carrier C1 while also continuing to provide service to the identified UEs that are now designated for DCI transmission on the PDCCH of another carrier (e.g., C2 or C3) in coverage area 14.

Figure 4:
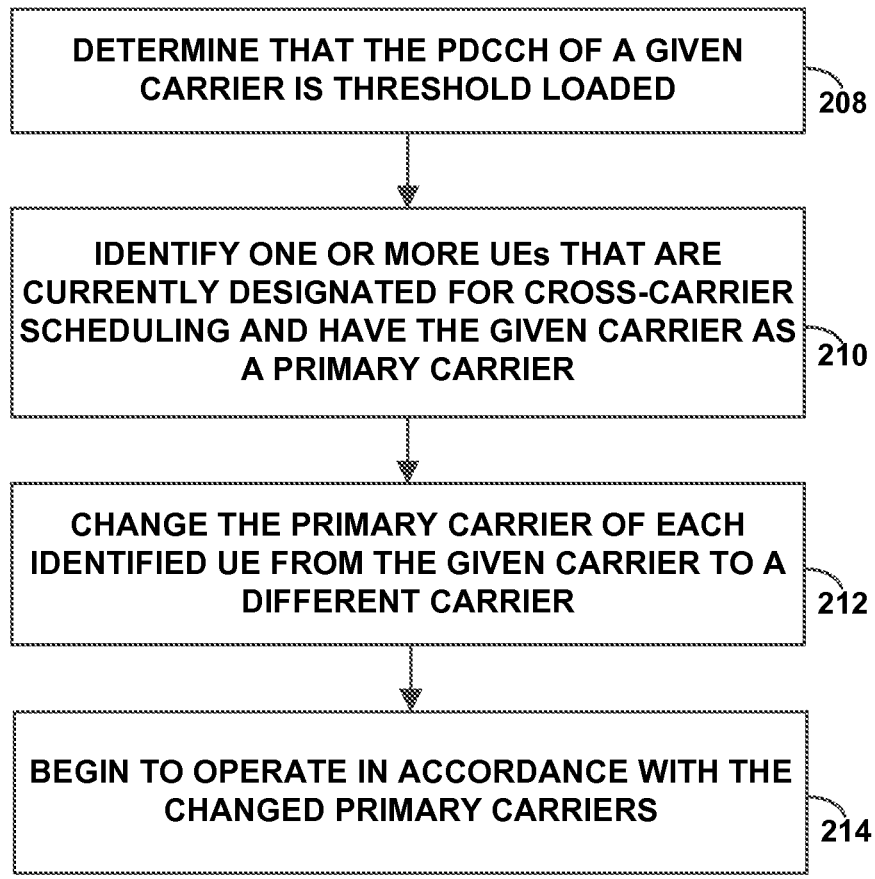
FIG. 4 is another flow chart depicting example functions that can be carried out in accordance with the disclosure.

FIG. 4 is another flow chart depicting functions that can be carried out by a base station in accordance with a second disclosed approach for reducing the load on a downlink control channel of a carrier. As above, these functions are described for purposes of illustration with reference to the LTE network arrangement depicted in FIG. 1 and the LTE air interface depicted in FIGS. 2A-2C, but it should be understood that the functions could be applied to other scenarios as well, and it should also be understood that other entities in a wireless communication system (e.g., a controller) may assist in carrying out some of these functions.

As shown in FIG. 4, at block 208, the eNodeB may determine that a downlink control channel of a given carrier, such as the PDCCH of carrier C1, is threshold loaded. The eNodeB may carry out this determination in various manners, including those described above with reference to block 200.

At block 210, in response to determining that the PDCCH of carrier C1 is threshold loaded, the eNodeB may then identify, from the UEs that are currently designated for DCI transmission on the PDCCH of carrier C1, one or more UEs that are currently designated for cross-carrier scheduling and have carrier C1 as the primary carrier. In one example, the eNodeB may carry out this identification based on stored data that indicates the scheduling and carrier designations for UEs in coverage area 14. But the eNodeB could carry out this identification in other manners as well.

The act of identifying the one or more UEs that are currently designated for cross-carrier scheduling and have a primary carrier of C1 could be implemented in various ways. For instance, in one implementation, this act could involve identifying all of the UEs that are currently designated for cross-carrier scheduling and have a primary carrier of C1. Alternatively, in another implementation, this act could involve identifying only a subset of the UEs that are currently designated for cross-carrier scheduling and have a primary carrier of C1. For example, the eNodeB could be configured to identify only up to a given number of UEs that are currently designated for cross-carrier scheduling and have a primary carrier of C1. In this example, the given number could either be predefined or could be defined dynamically based factors such as the loading of the PDCCH on carrier C1 (e.g., the given number may be set to the difference between the number of UEs that are currently designated for DCI transmission on the PDCCH of carrier C1 and a threshold number). Other examples are possible as well.

At block 212, after identifying the one or more UEs that are currently designated for cross-carrier scheduling and have a primary carrier of C1, the eNodeB may initiate a change of the primary carrier of each identified UE from carrier C1 to a different carrier in coverage area 14 (e.g., C2 or C3). In practice, this change will effectively cause each identified UE to be de-designated for DCI transmission on the PDCCH of carrier C1 and instead be designated for DCI transmission on the PDCCH of the UE's new primary carrier (e.g., C2 or C3) only.

The act of changing the primary carrier may take various forms. According to one implementation, the eNodeB may first select a new primary carrier for an identified UE. The eNodeB could perform this selection in various manners. As one example, the eNodeB could select the UE's new primary carrier to be whichever carrier in coverage area 14 has the lowest-loaded PDCCH. In this respect, the eNodeB may evaluate the PDCCH load for the available carriers in coverage area 14 (e.g., C2 and C3) using various techniques, some examples of which are described above with reference to block 200. As another example, the eNodeB could select the UE's new primary carrier based on RF conditions being perceived by the UE on each of the available carriers in coverage area 14, which the eNodeB may determine based on measurement reports (or the like) received from the UE. In this respect, the eNodeB may request a measurement report from the UE as part of the selection process. As yet another example, the eNodeB could select the UE's new primary carrier based on stored data that indicates predefined handover sequences in coverage area 14 (e.g., UEs on C1 are to be handed over to C2, UEs on C2 are to be handed over to C3, and so on). Other examples are possible as well.

Once the eNodeB has selected the UE's new primary carrier, the eNodeB may then initiate a handover of the UE from carrier C1 to the new primary carrier. This intra-carrier handover could take various forms, but in general, it may involve the eNodeB performing functions such as sending the UE a handover indication message (e.g., an RRC Connection Reconfiguration message) and allocating air-interface resources to the UE on the new primary carrier. The handover of the UE from carrier C1 to the new primary carrier may involve other functions as well (including functions related to designating carrier C1 as a secondary carrier). After the handover of the identified UEs is complete, the eNodeB may also update stored data that indicates the carrier designations for the identified UEs, to reflect that each identified UE has a new primary carrier and that carrier C1 is now a secondary carrier.

At block 214, the eNodeB may begin to operate in accordance with the changed primary carriers. For instance, in accordance with the changed primary carriers, the eNodeB may operate to send DCIs to each identified UE on the UE's new primary carrier (which will be C2 or C3) rather than carrier C1—even in situations where the DCIs are for shared-channel resource allocations on carrier C1. Thus, as with the first approach, this should result in a reduction of the load on the congested PDCCH of carrier C1, which may enable the eNodeB to provide better service to the UEs that are still designated for DCI transmission on the PDCCH of carrier C1 while also continuing to provide service to the identified UEs that are now designated for DCI transmission on the PDCCH of another carrier (e.g., C2 or C3) in coverage area 14.

In accordance with the present disclosure, these first and second approaches for reducing load on a downlink control channel of a given carrier may also be used together in various ways. For instance, in one implementation, the eNodeB may be configured to begin by carrying out the first approach for reducing load on the PDCCH of a given carrier. However, the first approach may not result in a sufficient load reduction on the PDCCH of the given carrier. For example, if the number of UEs that are designated for DCI transmission on carrier C1 exceeds a threshold number by some amount, but there is less than this amount of UEs that are designated for DCI transmission on the PDCCH of the given carrier and have a primary carrier other than carrier C1, the PDCCH of the carrier C1 may still be considered to be threshold loaded even after the eNodeB carries out the first approach. Thus, in this implementation, the eNodeB may be configured to evaluate whether the PDCCH of the given carrier is still threshold loaded after carrying out the first approach, and then if so, to carry out the second approach for reducing the load on the PDCCH of the given carrier.

In a similar manner, the eNodeB may be configured to begin by carrying out the second approach for reducing load on the PDDCH of a given carrier, and to thereafter carry out the first approach for reducing load on the PDDCH of the given carrier if the second approach does not result in a sufficient load reduction on the PDCCH of the given carrier. The eNodeB could be configured to implement the first and second approaches together in other manners as well.

Figure 5:
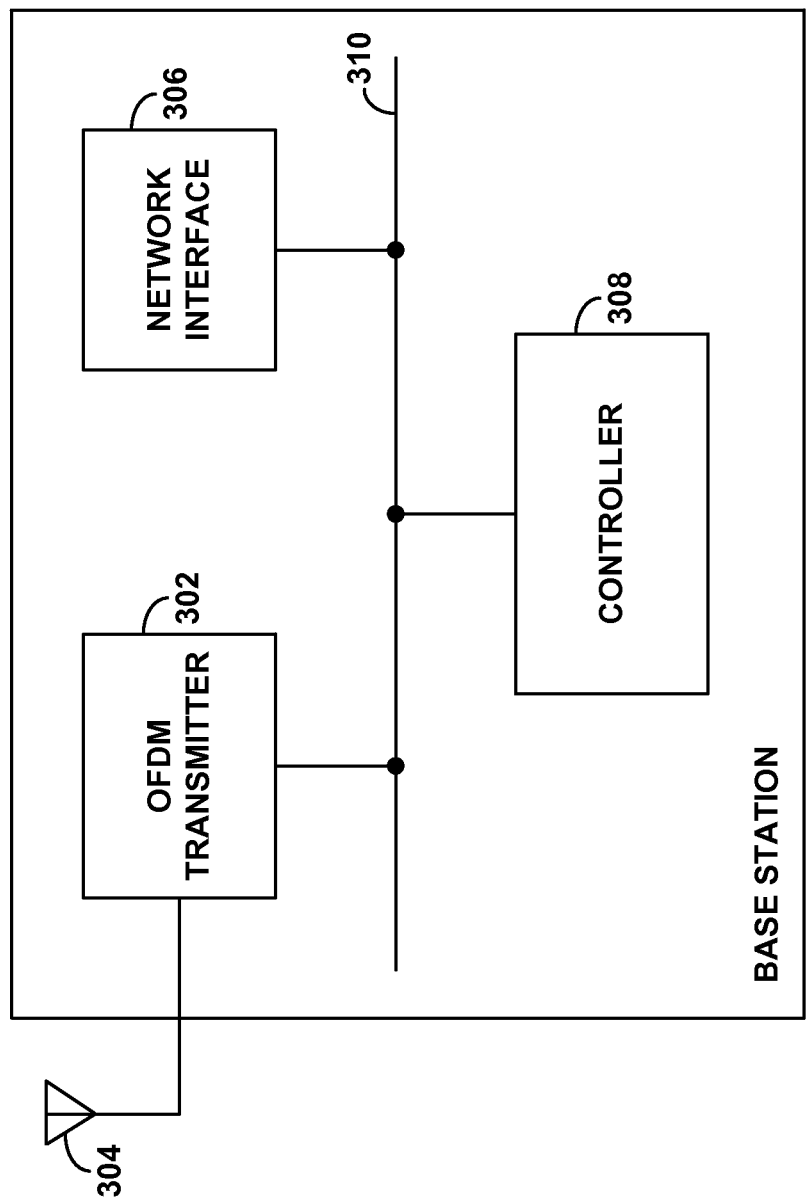
FIG. 5 is a simplified block diagram of an example base station operable in accordance with the disclosure.

Finally, FIG. 5 is a simplified block diagram of an example base station (e.g., an eNodeB), showing some of the functional components that may be included in such an entity to facilitate implementation of the disclosed methods. As shown in FIG. 5, the example base station includes an OFDM transmitter 302 and associated antenna structure 304, as well as a network interface 306, and a controller 308, with various ones of these or other components being communicatively linked together by a system bus, network, or other connection mechanism 310.

OFDM transmitter 302 and antenna structure 304 may function in combination to provide one or more ODFMA carriers as described above. Thus, in line with the discussion above, the OFDM transmitter 302 may be configured to receive data, generate OFDM symbols from the data, and transmit the OFDM symbols over a given carrier's downlink. Network interface 306 may then comprise a wired and/or wireless network communication interface (such as an Ethernet interface) through which the base station may receive data over a backhaul connection that connects the base station to one or more entities of a wireless network, such as an SGW for instance, for transmission of the data to one or more UEs served by the base station.

Controller 308, which may be integrated with OFDM transmitter 302 or one or more other components, may then schedule the data transmissions on each carrier's downlink and uplink and also control the transmission of control and/or bearer data each carrier's downlink. For example, controller 308 may allocate downlink and uplink resource blocks, generate corresponding DCIs, and control transmission by OFDM transmitter 302 accordingly.

Further, controller 308 may be configured to carry out the functions described above. For instance, the controller 308 may be configured to determine that a downlink control channel of a given one of these carriers (e.g., the PDCCH of carrier C1) is threshold loaded and then respond to this determination by (a) identifying a particular subset of the UEs that the base station currently has designated for DCI transmission on the given carrier and (b) acting to de-designate the identified subset of UEs for DCI transmission on the given carrier and instead designate the identified subset of UEs for DCI transmission only on one or more of the other carriers in the coverage area (e.g., carrier C2 and/or carrier C3).

Controller 308 could be implemented using hardware, software, and/or firmware. For example, controller 308 could include one or more processors and a non-transitory computer readable medium (e.g., volatile and/or non-volatile memory) that stores executable instructions. The executable instructions, when executed by the one or more processors, may cause controller 308 (and thus the base station) to perform any of the base station functions described herein.

Exemplary embodiments have been described above. Those skilled in the art will understand, however, that changes and modifications may be made to these embodiments without departing from the true scope and spirit of the invention.

We claim:

1. A method in a wireless communication system comprising a base station configured to serve user equipment devices (UEs) over a plurality of carriers in a coverage area, wherein each of the plurality of carriers defines a respective downlink control channel over which the base station transmits Downlink Control Information (DCI) messages for scheduling data transmissions with UEs in the coverage area, the method comprising:

the base station determining that a downlink control channel of a given carrier of the plurality of carriers is threshold loaded, wherein determining that the downlink control channel of the given carrier is threshold loaded comprises an operation selected from the group consisting of (i) determining that a number UEs that are currently designated for DCI transmission on the downlink control channel of the given carrier exceeds a threshold number, (ii) detecting usage of a threshold high percentage of resources of the downlink control channel of the given carrier, and (iii) detecting transmission of a threshold high quantity of data on the downlink control channel of the given carrier; and in response to the determining that the downlink control channel of a given carrier is threshold loaded, the base station (a) identifying a group of one or more UEs that are currently designated for DCI transmission on the downlink control channel of the given carrier but have a primary carrier that differs from the given carrier and then (b) beginning to serve the group of one or more UEs using cross-carrier scheduling.

2. The method of claim 1, wherein the downlink control channel of the given carrier comprises a Physical Downlink Control Channel (PDCCH).

3. The method of claim 1, wherein identifying the one or more UEs that are currently designated for DCI transmission on the downlink control channel of the given carrier but have a primary carrier that differs from the given carrier comprises identifying one or more UEs that are currently designated for same-carrier scheduling and that have the given carrier designated as a secondary carrier.

4. The method of claim 1, wherein identifying the group of one or more UEs that are currently designated for DCI transmission on the downlink control channel of the given carrier but have a primary carrier that differs from the given carrier comprises identifying all UEs that are currently designated for DCI transmission on the downlink control channel of the given carrier but have a primary carrier that differs from the given carrier.

5. The method of claim 1, wherein identifying the group of one or more UEs that are currently designated for DCI transmission on the downlink control channel of the given carrier but have a primary carrier that differs from the given carrier comprises identifying a subset of all UEs that are currently designated for DCI transmission on the downlink control channel of the given carrier but have a primary carrier that differs from the given carrier.

6. The method of claim 1, wherein the base station beginning to serve the group of one or more UEs using cross-carrier scheduling comprises, for each UE in the group:

the base station designating the UE for DCI transmission only on a downlink control channel of the primary carrier of the UE; and in accordance with the designating, the base station thereafter transmitting DCIs to the UE only on the downlink control channel of the primary carrier of the UE.

7. The method of claim 6, wherein the DCIs to the UE comprise at least one DCI for scheduling a data transmission with the UE on the given carrier.

8. The method of claim 1, further comprising:

after beginning to serve the group of one or more identified UEs using cross-carrier scheduling, the base station further determining that the downlink control channel of the given carrier is still threshold loaded; and in response to the further determining, the base station (a) identifying a second group of one or more UEs that are currently designated for cross-carrier scheduling and have the given carrier as a primary carrier and then (b) initiating a change of the primary carrier of each UE of the second group from the given carrier to a carrier other than the given carrier.

9. A method in a wireless communication system comprising a base station configured to serve user equipment devices (UEs) over a plurality of carriers in a coverage area, wherein each of the plurality of carriers defines a respective downlink control channel over which the base station transmits Downlink Control Information (DCI) messages for scheduling data transmissions with UEs in the coverage area, the method comprising:

the base station determining that a downlink control channel of a given carrier of the plurality of carriers is threshold loaded, wherein determining that the downlink control channel of the given carrier is threshold loaded comprises an operation selected from the group consisting of (i) determining that a number UEs that are currently designated for DCI transmission on the downlink control channel of the given carrier exceeds a threshold number, (ii) detecting usage of a threshold high percentage of resources of the downlink control channel of the given carrier, and (iii) detecting transmission of a threshold high quantity of data on the downlink control channel of the given carrier; and in response to the determining that the downlink control channel of a given carrier is threshold loaded, the base station (a) identifying a group of one or more UEs that are currently designated for cross-carrier scheduling and have the given carrier as a primary carrier and then (b) initiating a change of the primary carrier of each UE in the group from the given carrier to a carrier other than the given carrier.

10. The method of claim 9, wherein the downlink control channel of the given carrier comprises a Physical Downlink Control Channel (PDCCH).

11. The method of claim 9, wherein identifying the group of one or more UEs that are currently designated for cross-carrier scheduling and have the given carrier as a primary carrier comprises identifying all UEs that are currently designated for cross-carrier scheduling and have the given carrier as a primary carrier.

12. The method of claim 9, wherein identifying the group of one or more UEs that are currently designated for cross-carrier scheduling and have the given carrier as a primary carrier comprises identifying a subset of all UEs that are currently designated for cross-carrier scheduling and have the given carrier as a primary carrier.

13. The method of claim 12, wherein identifying a subset of all UEs that are currently designated for cross-carrier scheduling and have the given carrier as a primary carrier comprises identifying up to a given number of UEs that are currently designated for cross-carrier scheduling and have the given carrier as a primary carrier, wherein the given number is defined based on a load of the downlink control channel of the given carrier.

14. The method of claim 9, wherein the base station initiating the change of the primary carrier of each UE in the group from the given carrier to a different carrier of the plurality of carriers comprises, for each UE in the group:

selecting the different carrier for the UE; and
initiating a handover of the UE from the given carrier to the selected different carrier.

15. The method of claim 14, wherein selecting the different carrier for the UE comprises:

identifying, from the plurality of carriers, whichever carrier has a downlink control channel with a lowest load; and selecting the identified carrier as the different carrier for the UE.

16. A base station comprising:

a wireless communication interface configured to provide a plurality of carriers in a coverage area for serving user equipment devices (UEs), wherein each of the plurality of carriers defines a respective downlink control channel for transmitting Downlink Control Information (DCI) messages for scheduling data transmissions with UEs in the coverage area, wherein the wireless communication interface comprises a transmitter and an antenna structure; and a controller configured to make a determination that a downlink control channel of a given carrier of the plurality of carriers is threshold loaded, and then to respond to the determination by (a) identifying a group of one or more UEs that are currently designated for DCI transmission on the downlink control channel of the given carrier but have a primary carrier that differs from the given carrier and (b) causing the base station to begin serving the group of one or more UEs using cross-carrier scheduling, wherein the controller comprises a programmed processing unit, wherein making the determination that the downlink control channel of the given carrier is threshold loaded comprises an operation selected from the group consisting of (i) determining that a number UEs that are currently designated for DCI transmission on the downlink control channel of the given carrier exceeds a threshold number, (ii) detecting usage of a threshold high percentage of resources of the downlink control channel of the given carrier, and (iii) detecting transmission of a threshold high quantity of data on the downlink control channel of the given carrier.

17. The base station of claim 16, wherein the controller is configured to make a further determination, after causing the base station to begin serving the group of one or more identified UEs using cross-carrier scheduling, that the downlink control channel of the given carrier is still threshold loaded, and then to respond to the further determination by (a) identifying a second group of one or more UEs that are currently designated for cross-carrier scheduling and have the given carrier as a primary carrier and (b) causing the base station to initiate a change of the primary carrier of each UE of the second group from the given carrier to a different carrier of the plurality of carriers.

* * * * *